United States Patent [19]

Fujibayashi

[11] 4,398,808

[45] Aug. 16, 1983

[54] COMPACT ZOOM LENS OF HIGH MAGNIFICATION

[75] Inventor: Kazuo Fujibayashi, Yokohama, Japan

[73] Assignee: Canon Kabushiki Kaisha, Tokyo, Japan

[21] Appl. No.: 225,341

[22] Filed: Jan. 15, 1981

[30] Foreign Application Priority Data

Jan. 31, 1980 [JP] Japan .................................. 55-12931

[51] Int. Cl.³ ............................................. G02B 15/18
[52] U.S. Cl. .................................................... 350/427
[58] Field of Search .................................. 350/427, 428

[56] References Cited

U.S. PATENT DOCUMENTS 3,547,523 12/1970 Kojima .
3,970,367 7/1976 Tsuji .................................... 350/427
4,189,213 2/1980 Iizuka .

FOREIGN PATENT DOCUMENTS

82637 2/1964 France .................................. 350/427
48057 10/1966 German Democratic Rep. ................................... 350/427

*Primary Examiner*—John K. Corbin
*Assistant Examiner*—Rebecca D. Gass
*Attorney, Agent, or Firm*—Fitzpatrick, Cella, Harper & Scinto

[57] ABSTRACT

A compact zoom lens of high magnification comprises four lens groups. In succession from the object side, the first lens group has a positive refractive power and a focusing function, the second lens group has a negative refractive power and a magnification changing function and consists, in succession from the object side, of a negative lens having its concave surface of sharper curvature facing the image side, a negative doublet lens consisting of a biconcave lens and a positive lens, and a negative lens having its concave surface of sharper curvature facing the object side, the third lens group has a positive refractive power and is reciprocable to correct the movement of the image point resulting from zooming, and the fourth lens group has a negative refractive power. Correction of aberrations is well accomplished by suitably selecting the focal length of the doublet lens in the second lens group and the curvature radii of the third, fourth and sixth lens surfaces in the second lens group as viewed from the object side.

3 Claims, 50 Drawing Figures

FIG. 1

FIG. 2A
F/4.5
SPHERICAL ABERRATION
−0.50 to 0.50

FIG. 2B
W=22.9°
ΔS, ΔM
ASTIGMATIZM
−0.50 to 0.50

FIG. 2C
W=22.9°
DISTORTION
−5.00% to 5.00%

FIG. 2D
W=22.9°
g
MAGNIFICATION CHROMATIC ABERRATION
−0.05 to 0.05

FIG. 3A
F/4.5
d, g
SPHERICAL ABERRATION
−0.50 to 0.50

FIG. 3B
W=10°
ΔS, ΔM
ASTIGMATIZM
−0.50 to 0.50

FIG. 3C
W=10°
DISTORTION
−5.00% to 5.00%

FIG. 3D
W=10°
g
MAGNIFICATION CHROMATIC ABERRATION
−0.05 to 0.05

FIG. 4A

SPHERICAL ABERRATION

FIG. 4B

ASTIGMATIZM

FIG. 4C

DISTORTION

FIG. 4D

MAGNIFICATION CHROMATIC ABERRATION

FIG. 5A

SPHERICAL ABERRATION

FIG. 5B

ASTIGMATIZM

FIG. 5C

DISTORTION

FIG. 5D

MAGNIFICATION CHROMATIC ABERRATION

FIG. 6A

-0.50  0.50
SPHERICAL
ABERRATION

FIG. 6B

-0.50  0.50
ASTIGMATIZM

FIG. 6C

-5.00%  5.00%
DISTORTION

FIG. 6D

-0.05  0.05
MAGNIFICATION
CHROMATIC
ABERRATION

FIG. 7A

-0.50  0.50
SPHERICAL
ABERRATION

FIG. 7B

-0.50  0.50
ASTIGMATIZM

FIG. 7C

-5.00%  5.00%
DISTORTION

FIG. 7D

-0.05  0.05
MAGNIFICATION
CHROMATIC
ABERRATION

FIG. 8A — SPHERICAL ABERRATION
FIG. 8B — ASTIGMATIZM
FIG. 8C — DISTORTION
FIG. 8D — MAGNIFICATION CHROMATIC ABERRATION

FIG. 9A — SPHERICAL ABERRATION
FIG. 9B — ASTIGMATIZM
FIG. 9C — DISTORTION
FIG. 9D — MAGNIFICATION CHROMATIC ABERRATION

FIG. 14

COMPACT ZOOM LENS OF HIGH MAGNIFICATION

BACKGROUND OF THE INVENTION

1. Field of the Invention

This invention relates to a compact photographic zoom lens of high magnification for a 35 mm film still camera.

2. Description of the Prior Art

A zoom lens can freely change the magnification of an object without interchanging the lens. That is, it can photograph an object while changing the object to a predetermined dimension on the spot in accordance with the photographer's intention. Therefore, zoom lenses have become more and more widely used. Usually, zoom lenses having a magnification change ratio of 5 to 10 times are used with 8 mm cinecameras, and zoom lenses having a magnification change ratio of 10 to 30 times are used with television cameras. In the case of still cameras having great picture plane dimensions and chiefly photographing stationary objects, as compared with 8 mm cameras or television cameras having small picture dimensions and chiefly photographing moving objects, an optically higher performance is required and it is therefore difficult to obtain zoom lenses of a great magnification change ratio. This is because it is difficult to accomplish well correction of aberrations in zoom lenses of great magnification change ratio for still cameras. Particularly, it is often the case that the quality of photographs by a zoom lens in which only the magnification change ratio is made great, is remarkably lower than the quality of photographs by a lens of a single focal length, and an effort to make the zoom lens compact in order to improve the operability thereof often results in a disadvantage that aberration fluctuation becomes great. Compact photographic zoom lenses of high magnification improved to overcome the above-noted disadvantages have been proposed in U.S. Pat. No. 4,189,213 and Japanese Patent Publication No. 2941/1971.

SUMMARY OF THE INVENTION

It is an object of the present invention to provide a high performance zoom lens in which the magnification change ratio from the standard angle of view to the long telephoto is great when use is made of film of a size of the order of 35 mm and whose total length is shorter than the focal length of the telephoto side end. In its specific embodiments which will hereinafter be described, the present invention achieves a zoom lens whose magnification changes from a focal length of 50 mm to a focal length of 300 mm as a lens for a 35 mm single lens reflex camera.

In recent years, there has been a strong desire for compactness of photographic lenses. To make a zoom lens compact, there are two methods, namely, a method of shortening the magnification changing portion thereof and a method of shortening the relay portion thereof. The present invention has succeeded in making the lens compact while minimizing the fluctuations of aberrations occurring during magnification change by using an appropriate lens form as the magnification changing portion in the former method.

The invention will become more fully apparent from the following detailed description thereof taken in conjunction with the accompanying drawings.

BRIEF DESCRIPTION OF THE DRAWINGS

FIGS. 2A, 2B, 2C and 2D to FIGS. 4A, 4B, 4C and 4D show the various aberrations in Embodiment 1 of the present invention.

FIGS. 5A, 5B, 5C and 5D to FIGS. 7A, 7B, 7C and 7D show the various aberrations in Embodiment 2 of the present invention.

FIGS. 8A, 8B, 8C and 8D to FIGS. 10A, 10B, 10C show the various aberrations in Embodiment 3 of the present invention.

FIGS. 11A, 11B, 11C and 11D to FIGS. 13A, 13B, 13C and 13D show the various aberrations in Embodiment 4 of the present invention.

DESCRIPTION OF THE PREFERRED EMBODIMENTS

The present invention comprises, in succession from the object side, a positive first lens group, a negative second lens group, a positive third lens group and a negative fourth lens group. The first lens group has a focusing function, the second lens group has the function of effecting magnification change by moving on the optical axis, and the third lens group is reciprocable to correct the movement of the image plane resulting from the movement of the second lens group. The second lens group has, in succession from the object side, a negative lens having its concave surface of sharper curvature facing the image side, a negative doublet lens consisting of a biconcave lens and a positive lens, and a negative lens having its concave surface of sharper curvature facing the object side. The third lens group has, in succession from the object side, a biconvex lens, a doublet lens consisting of a negative meniscus lens and a biconvex lens, and a positive lens having its convex surface of sharper curvature facing the object side. The lens system satisfies one or more of the following conditions:

(1) $0 < Fw/|F_{II2}| < 0.1$, but $F_{II2} < 0$
(2) $0.85 < R_{II4}/Fw < 1.2$
(3) $0.2 < R_{II6}/R_{II3} < 0.6$
(4) $0.08 < Fw/F_{III2} < 0.35$
(5) $1.0 < |R_{III2}|/R_{III1} < 1.6$, but $R_{III2} < 0$ $$0.35 < \frac{(N_{III2} - N_{III3})}{R_{III4}} Fw < 0.45 \qquad (6)$$

(7) $38 < \nu_{III3} - \nu_{III2} < 60$ where $F_{II2}$ represents the focal length of the doublet lens in the second lens group, $R_{IIi}$ represents the curvature radius of the ith lens surface of the second lens group, $F_{III2}$ represents the focal length of the doublet lens in the third lens group, $R_{IIIj}$ represents the curvature radius of the jth lens surface of the third lens group, $N_{IIIj}$ represents the refractive index of the glass of the jth lens in the third lens group for d-line, $\nu_{IIIj}$ represents the Abbe number of the glass of the jth lens in the third lens group, and Fw represents the focal length of the wide angle end (short focal length) of the entire lens system.

The meaning of each condition will now be described.

To make the magnification changing portion compact, the power of the second lens group is made greater than the distribution usually adopted by a zoom lens of this type. Generally, if the power is made greater, the aberration fluctuation accompanying the movement in the direction of the optical axis for magnification change is liable to become great.

Therefore, the problem of aggravated aberrations has been solved by forming the second lens group by three groups and setting up condition (1) in the second group. If the lower limit value of this condition is exceeded, the negative distortion will be remarkably increased on the focal length side of the wide angle and, if the upper limit value of this condition is exceeded, the high order aberrations such as coma and astigmatism will be remarkably created.

The cemented surface of the second group in the second lens group contributes to the correction of spherical aberration and on-axis chromatic aberration and provides an optimal aberration correction by satisfying condition (2). If the upper limit value of this condition is exceeded, correction of spherical aberration and on-axis chromatic aberration will become difficult and, if the lower limit value of this condition is exceeded, inwardly directed coma and high order chromatic difference of magnification will be remarkably created in the focal length on the wide angle side.

On the other hand, by effecting an appropriate power distribution in the second lens group, the spherical aberration which is liable to be over-corrected in the focal length on the telephoto side can be appropriately corrected and this is realized by condition (3). If the upper limit value of this condition is exceeded, spherical aberration will be remarkably over-corrected in the focal length on the telephoto side and, if the lower limit value of this condition is exceeded, the fluctuation of coma and chromatic difference of magnification accompanying the magnification change will become remarkable. The third lens group reciprocates on the optical axis to correct the movement of the image plane accompanying the magnification change and therefore, like the second lens group, it may cause creation of aberration fluctuation. Moreover, the power of the third lens group has been made great to make the lens system compact and this has led to a form in which aberration fluctuation is more liable to occur.

Therefore, the aberration fluctuation is suppressed by forming the third lens group by three groups to divide the power thereof and satisfying conditions (4), (5), (6) and (7).

Condition (4) divides the power without causing curvature of image field to be created and, if the upper limit value of this condition is exceeded, the image plane will fall down in the negative direction and, if the lower limit value of this condition is exceeded, the meaning of power division will become lessened and the fluctuation of spherical aberration, etc. accompanying the magnification change will become remarkable.

Condition (5) by balancing corrects the fluctuations of spherical aberration and astigmatism accompanying the magnification change and, if the upper limit value of this condition is exceeded, the fluctuation of spherical aberration will be aggravated and, if the lower limit value of this condition is exceeded, the fluctuation of astigmatism will be aggravated.

Condition (6) effectively corrects spherical aberration by making the cemented surface into a convex surface facing the object side and by providing that surface with a strong negative power without causing creation of coma and, if the upper limit value of this condition is exceeded, spherical aberration will be over-corrected and, if the lower limit value of this condition is exceeded, spherical aberration will be under-corrected. Condition (7) corrects the on-axis chromatic aberration and, if the lower limit value of this condition is exceeded, chromatic aberration will be remarkably created and, if the upper limit value of this condition is exceeded, chromatic aberration will be over-corrected.

What offers a problem particularly in a case where the optical performance of a telephoto lens having a relatively long focal length is discussed is a secondary spectrum. In the zoom lens of the present invention as well, the focal length is considerably great on the telephoto side and therefore, the secondary spectrum must be taken into consideration. Especially, the first, second and third lens groups are moved separately on the optical axis and therefore, the aberrations in these lens groups are independently minimized to minimize the aberration fluctuation accompanying the magnification change and as also regards the secondary spectrum, similar independent aberration correction is necessary. As is well-known, an effective method of correcting the secondary spectrum is to use abnormal dispersion glass as the first lens group of a zoom lens.

In addition to this, to cope with the task of minimizing the fluctuation of the secondary spectrum, the present invention has succeeded in correcting the secondary spectrum on the telephoto side as well as in each focal length by using abnormal dispersion glass as the third lens group having a positive power.

The condition therefore is $$-0.0023 < (\theta_{III3} - \theta_{III2})/(\nu_{III3} - \nu_{III2}) < 0$$

where $\theta_{IIIj}$ is the partial dispersion ratio of the jth lens in the third lens group. If the lower limit value of this condition is exceeded, the secondary spectrum on the telephoto side will of course be increased and the fluctuation of chromatic aberration accompanying magnification change will become great. In FIG. 6, the difference in fluctuation of on-axis chromatic aberration is shown, and A and B in the Figure correspond to Embodiments 1 and 4, respectively. A is nearer to the lower limit value of this condition and is greater in fluctuation than B.

Figure 1:
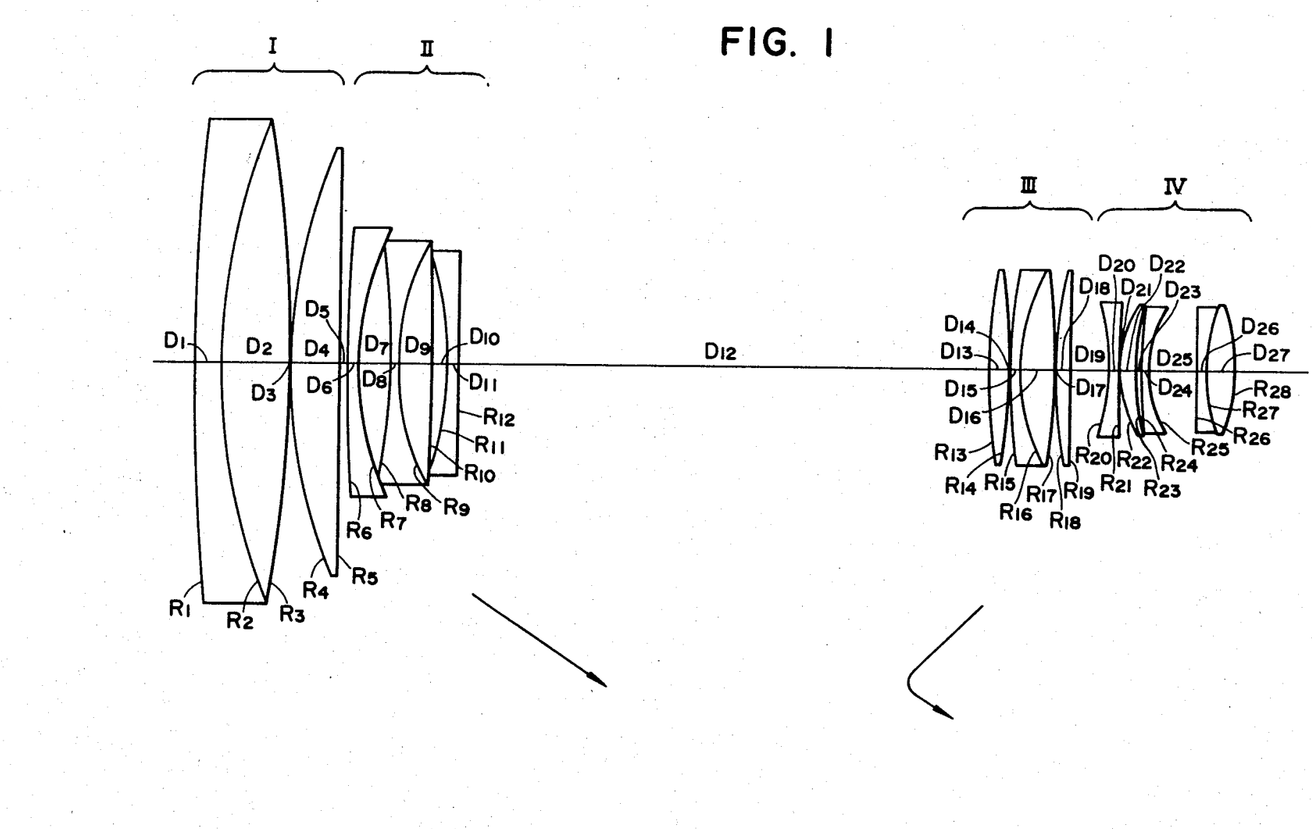
FIG. 1 is a cross-sectional view of the lens according to an embodiment of the present invention.
Figure 2A:
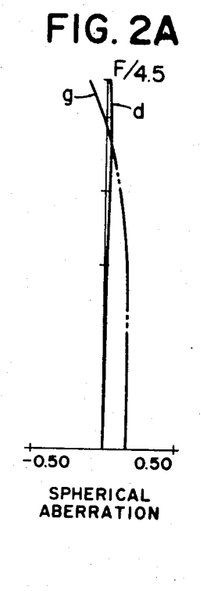
Figure 2B:
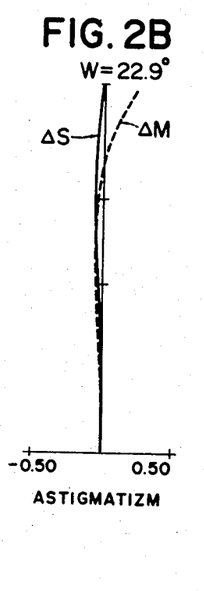
Figure 2C:
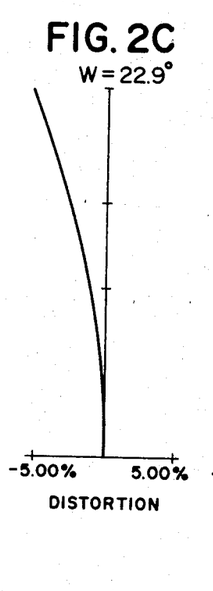
Figure 2D:
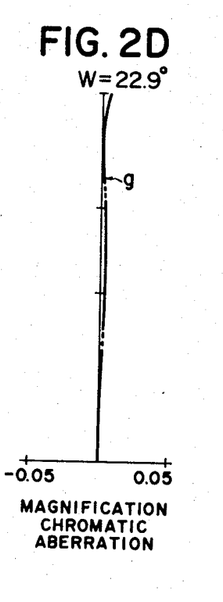
Figure 3A:
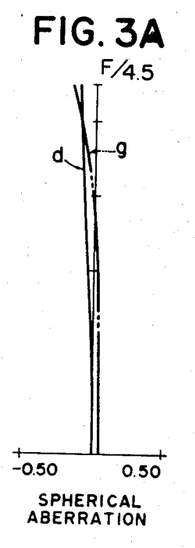
Figure 3B:
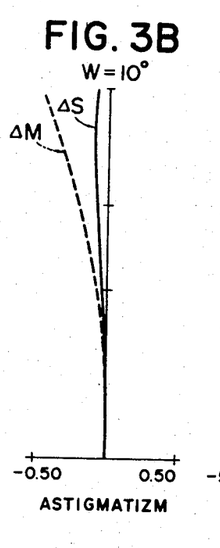
Figure 3C:
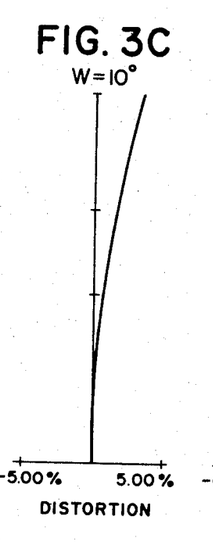
Figure 3D:
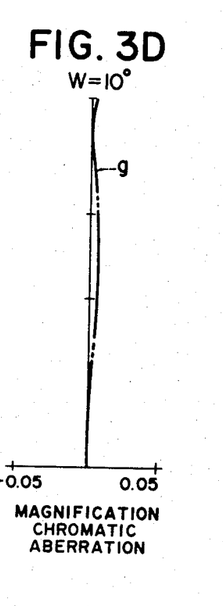
Figure 4A:
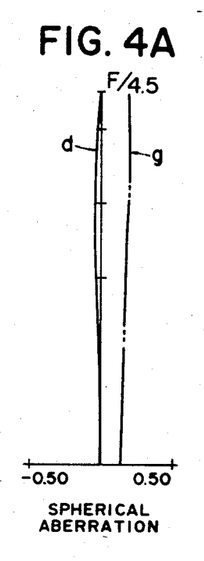
Figure 4B:
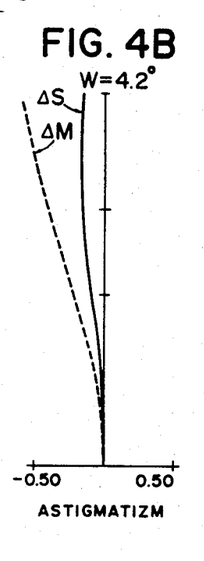
Figures 4C, 4D:
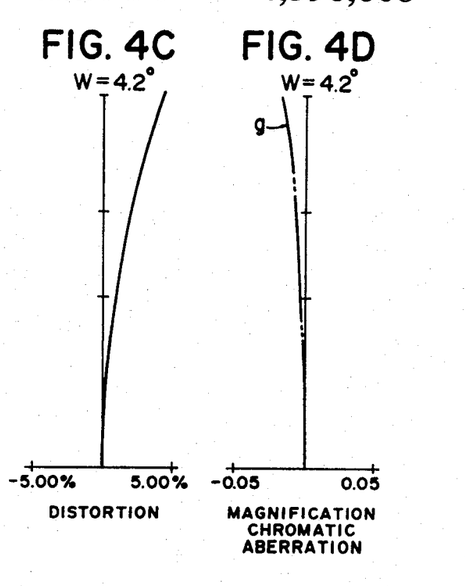
Figure 5A:
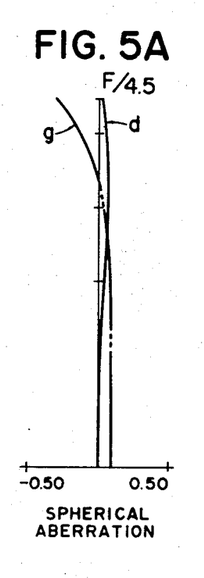
Figure 5B:
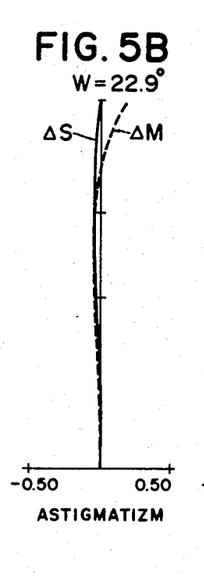
Figure 5C:
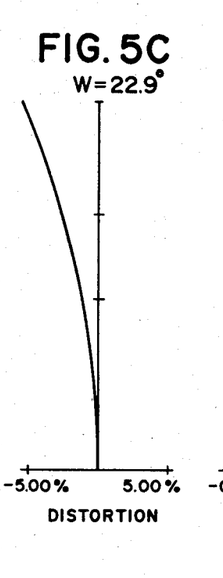
Figure 5D:
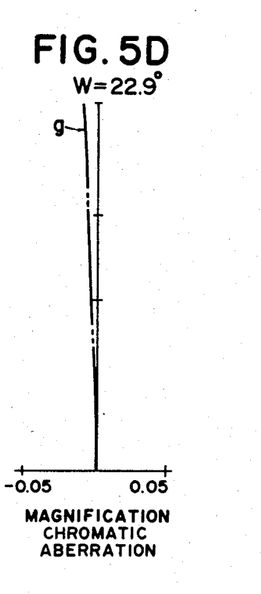
Figure 6A:
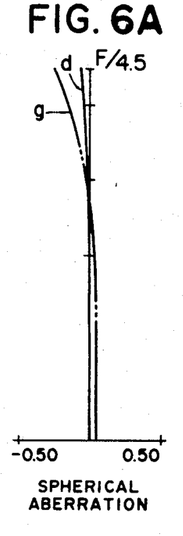
Figure 6B:
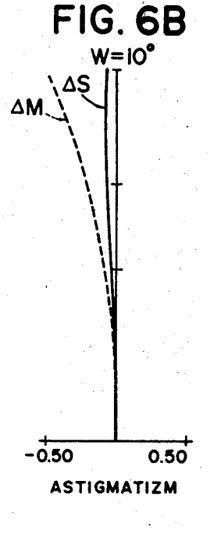
Figure 6C:
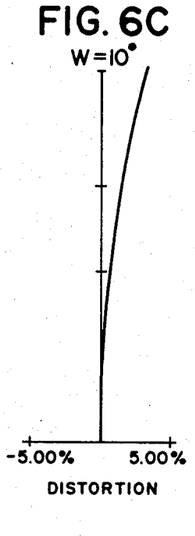
Figure 6D:
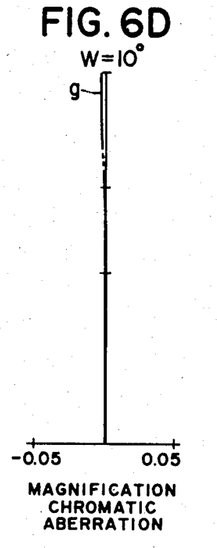
Figure 7A:
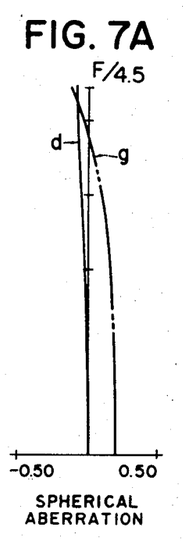
Figure 7B:
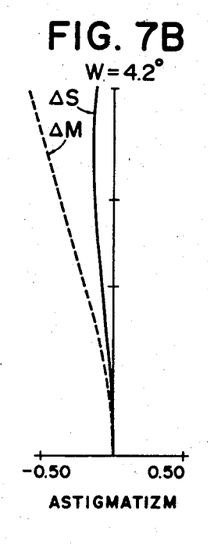
Figure 7C:
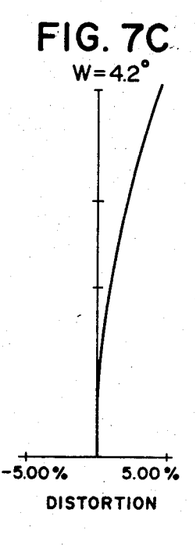
Figure 7D:
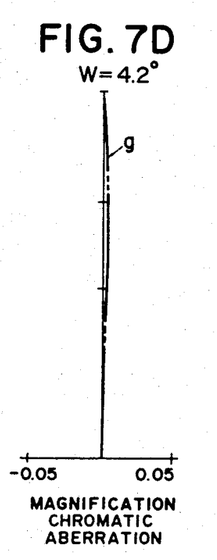
Figure 8A:
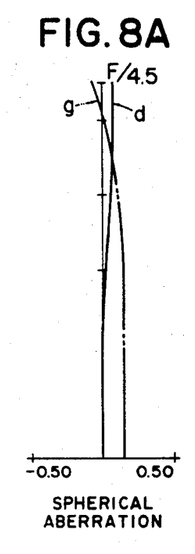
Figure 8B:
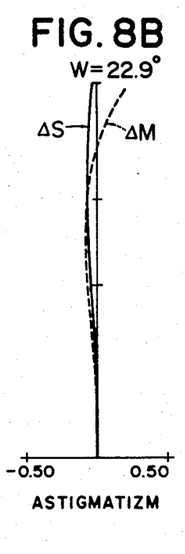
Figure 8C:
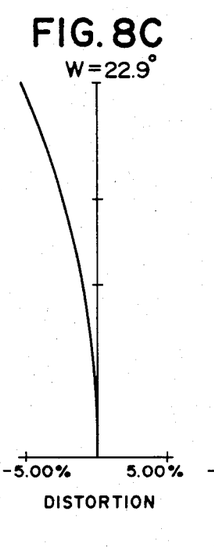
Figure 8D:
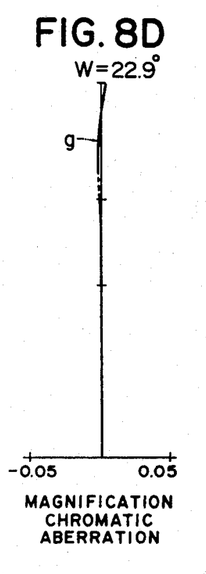
Figure 9A:
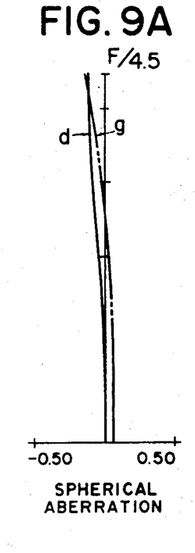
Figure 9B:
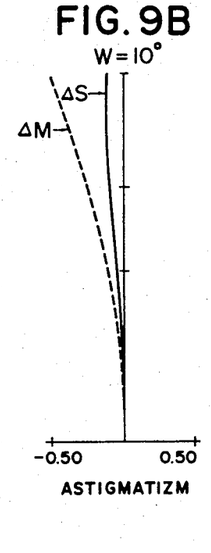
Figure 9C:
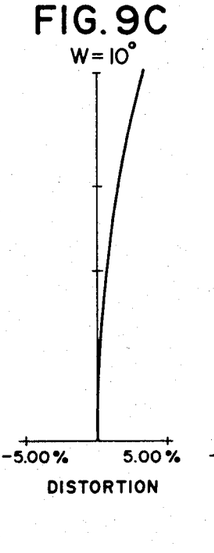
Figure 9D:
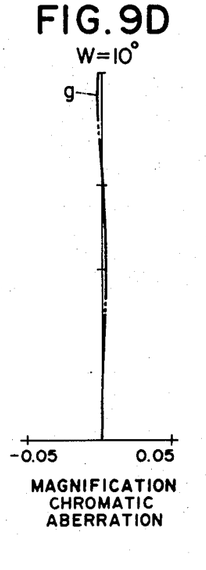
Figure 10A:
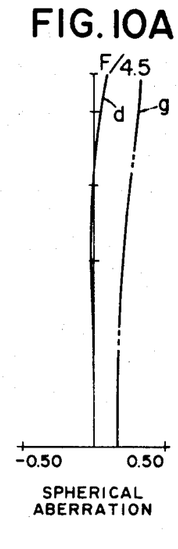
Figure 10B:
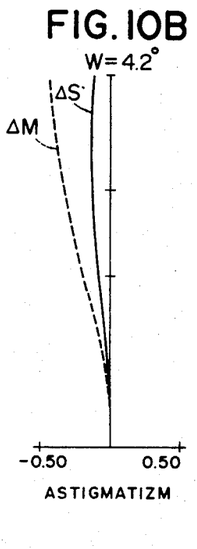
Figure 10C:
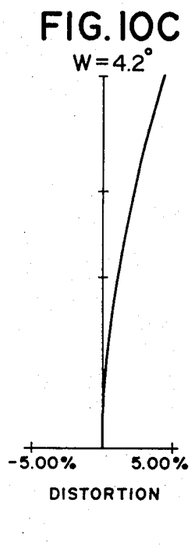
Figure 10D:
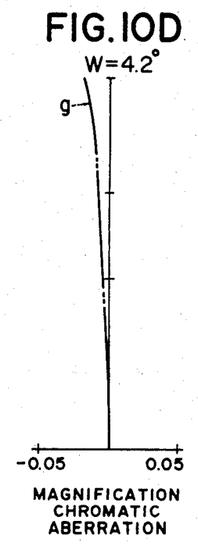
Figure 11A:
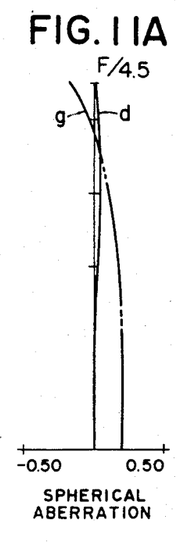
Figure 11B:
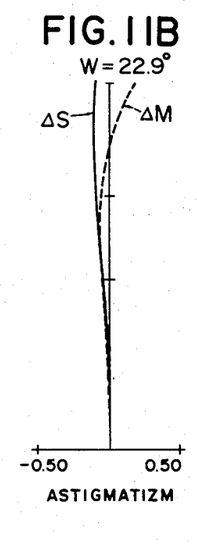
Figure 11C:
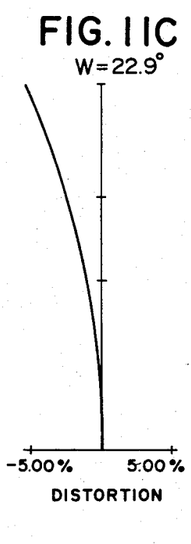
Figure 11D:
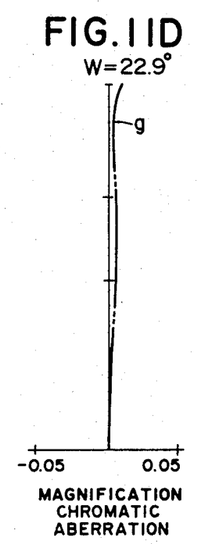
Figure 12A:
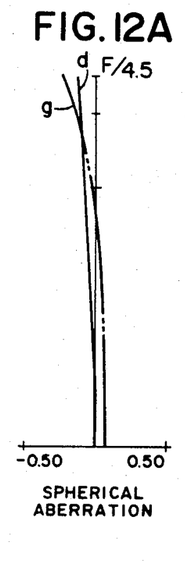
Figure 12B:
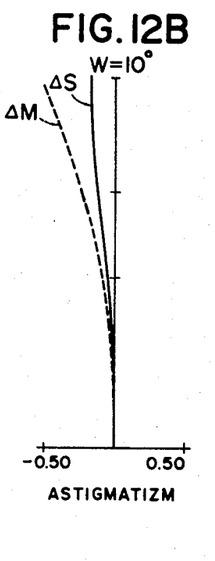
Figure 12C:
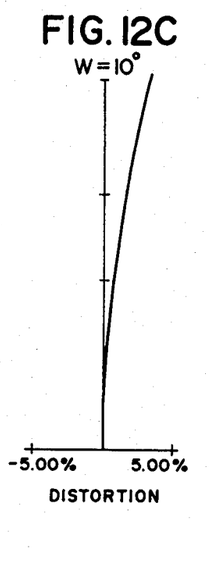
Figure 12D:
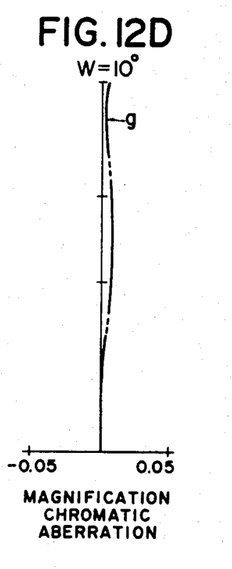
Figure 13A:
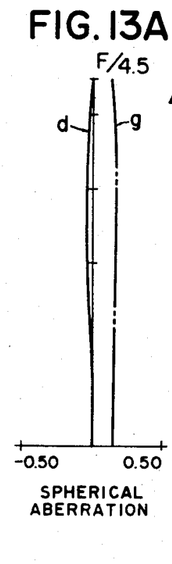
Figure 13B:
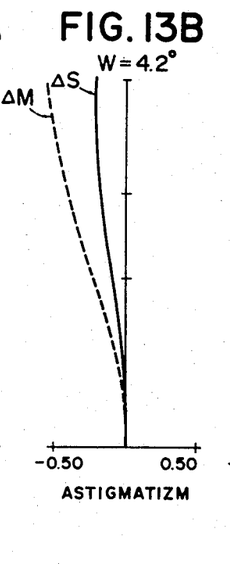
Figure 13C:
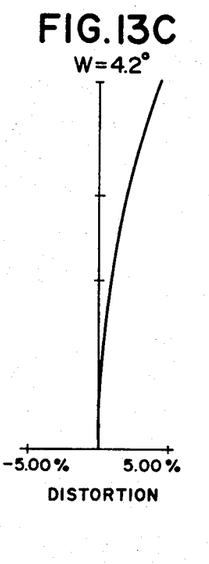
Figure 13D:
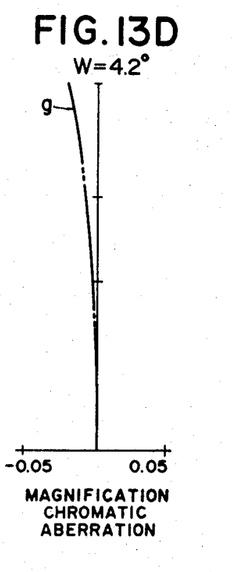
Figure 14:
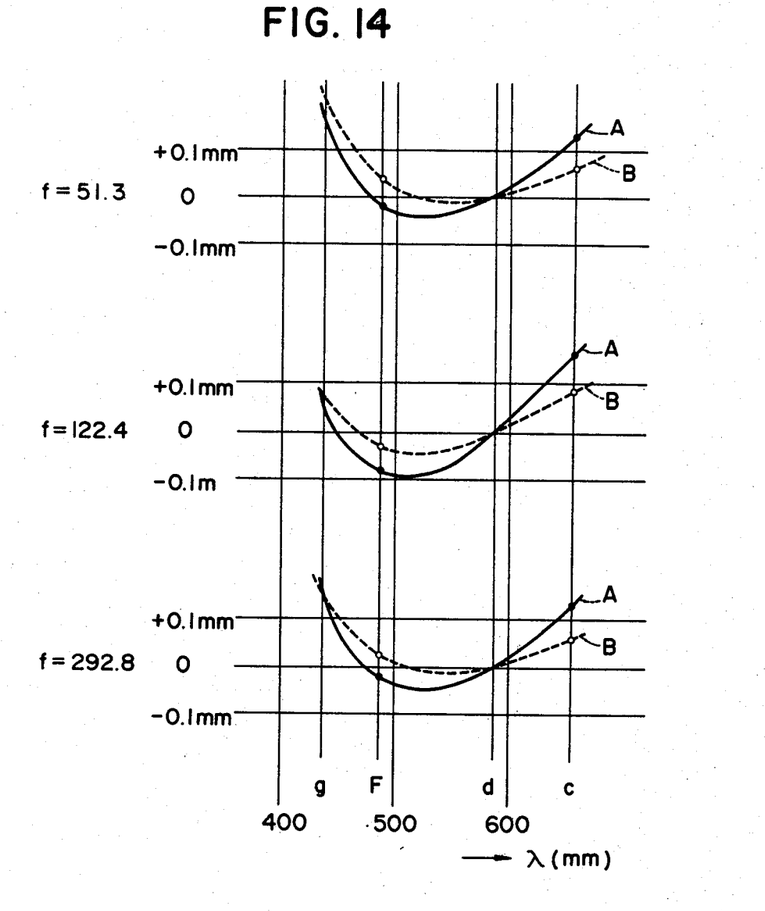
FIG. 14 shows the chromatic aberrations in Embodiments 1 and 4.

Embodiments of the present invention will hereinafter be described, and a cross-section of the lens of Embodiment 1 is shown in FIG. 1, and the spherical aberration, astigmatism, distortion and chromatic difference of magnification in Embodiments 1, 2, 3 and 4 are shown in FIGS. 2A, 2B and 2C to FIGS. 5A, 5B and 5C. In FIG. 1, I designates the first lens group, II designates the second lens group, III designates the third lens group and IV designates the fourth lens group. In FIGS. 2 to 5, A shows the longitudinal aberration of the wide angle side with respect to an object at infinity, B shows the longitudinal aberration of the intermediate side with respect to an object at infinity, and B shows the longitudinal aberration of the telephoto side with respect to an object at infinity.

In the numerical data shown below, Ri represents the curvature radius of each lens surface, Di represents the thickness or air space of each lens, nd represents the refractive index of the material of each lens for d-line, and $\nu d$ represents the Abbe number of the material of each lens for d-line.

NUMERICAL DATA OF EMBODIMENT 1 f = 51.3 ~ 292.8 F-number 1: 4.5

|    | R         | D        | nd      | νd   |
|----|-----------|----------|---------|------|
| 1  | 544.953   | 4.00     | 1.83400 | 37.2 |
| 2  | 114.136   | 13.17    | 1.49700 | 81.6 |
| 3  | −288.850  | 0.20     | 1.      |      |
| 4  | 106.829   | 8.54     | 1.56873 | 63.1 |
| 5  | −8731.945 | $D_5$    | 1.      |      |
| 6  | 428.922   | 2.20     | 1.77250 | 49.6 |
| 7  | 60.279    | 5.04     | 1.      |      |
| 8  | −213.914  | 2.00     | 1.71300 | 53.9 |
| 9  | 51.823    | 6.22     | 1.80518 | 25.4 |
| 10 | −778.386  | 2.49     | 1.      |      |
| 11 | −73.697   | 2.00     | 1.69680 | 55.5 |
| 12 | −846.906  | $D_{12}$ | 1.      |      |
| 13 | 99.436    | 3.72     | 1.56873 | 63.1 |
| 14 | −151.646  | 0.15     | 1.      |      |
| 15 | 93.467    | 1.70     | 1.80518 | 25.4 |
| 16 | 41.434    | 6.06     | 1.48749 | 70.1 |
| 17 | −190.628  | 0.15     | 1.      |      |
| 18 | 77.335    | 3.05     | 1.56873 | 63.1 |
| 19 | −8794.965 | $D_{19}$ | 1.      |      |
| 20 | −50.443   | 1.50     | 1.60311 | 60.7 |
| 21 | 153.228   | 0.20     | 1.      |      |
| 22 | 21.649    | 2.99     | 1.75520 | 27.5 |
| 23 | 38.504    | 1.01     | 1.      |      |
| 24 | 93.360    | 1.40     | 1.69680 | 55.5 |
| 25 | 22.509    | 9.03     | 1.      |      |
| 26 | −492.983  | 1.50     | 1.67270 | 32.1 |
| 27 | 38.003    | 4.98     | 1.58913 | 61.1 |
| 28 | −34.457   |          |         |      | b.f. = 98.96 Total length 287.85
The diaphragm surface lies 4.29 ahead of the 20th surface.

| f        | 51.3  | 122.4 | 292.8 |
|----------|-------|-------|-------|
| $D_5$    | 1.64  | 44.14 | 86.64 |
| $D_{12}$ | 96.97 | 43.99 | 1.73  |
| $D_{19}$ | 6.99  | 17.46 | 17.22 |

NUMERICAL DATA OF EMBODIMENT 2 f = 51.3 ~ 292.8 F-number 1: 4.5

|    | R         | D        | nd      | νd   |
|----|-----------|----------|---------|------|
| 1  | 496.402   | 4.00     | 1.83400 | 37.2 |
| 2  | 114.938   | 13.23    | 1.49700 | 81.6 |
| 3  | −302.726  | 0.20     | 1.      |      |
| 4  | 108.573   | 8.76     | 1.56873 | 63.1 |
| 5  | −7840.922 | $D_5$    | 1.      |      |
| 6  | 1304.506  | 2.20     | 1.77250 | 49.6 |
| 7  | 59.272    | 4.42     | 1.      |      |
| 8  | −260.092  | 2.00     | 1.71300 | 53.9 |
| 9  | 47.500    | 5.50     | 1.80518 | 25.4 |
| 10 | 800.305   | 2.91     | 1.      |      |
| 11 | −65.811   | 2.00     | 1.69680 | 55.5 |
| 12 | −155.709  | $D_{12}$ | 1.      |      |
| 13 | 115.000   | 3.53     | 1.56873 | 63.1 |
| 14 | −125.000  | 0.15     | 1.      |      |
| 15 | 87.070    | 1.70     | 1.80518 | 25.4 |
| 16 | 40.377    | 5.34     | 1.48749 | 70.1 |
| 17 | −839.975  | 0.15     | 1.      |      |
| 18 | 75.463    | 3.33     | 1.56873 | 63.1 |
| 19 | −417.685  | $D_{19}$ |         |      |
| 20 | −49.421   | 1.50     | 1.60311 | 60.7 |
| 21 | 153.254   | 0.20     | 1.      |      |
| 22 | 21.647    | 2.80     | 1.75520 | 27.5 |
| 23 | 38.616    | 1.22     | 1.      |      |
| 24 | 92.102    | 1.40     | 1.69680 | 55.5 |
| 25 | 22.530    | 9.05     | 1.      |      |
| 26 | −539.261  | 1.50     | 1.67270 | 32.1 |
| 27 | 38.242    | 5.02     | 1.58913 | 61.1 |
| 28 | −34.376   |          | 1.      |      | b.f. = 100.04 Total length 287.89
The diaphragm surface lies 4.2 ahead of the 20th surface.

| f        | 51.3  | 122.4 | 292.8 |
|----------|-------|-------|-------|
| $D_5$    | 2.44  | 44.94 | 87.44 |
| $D_{12}$ | 96.38 | 43.4  | 1.14  |
| $D_{19}$ | 6.9   | 17.37 | 17.13 |

NUMERICAL DATA OF EMBODIMENT 3 f = 51.3 ~ 292.8 F-number 1: 4.5

|    | R           | D        | nd      | νd   |
|----|-------------|----------|---------|------|
| 1  | 527.100     | 4.00     | 1.83400 | 37.2 |
| 2  | 114.444     | 13.21    | 1.49700 | 81.6 |
| 3  | −294.039    | 0.20     | 1.      |      |
| 4  | 106.635     | 8.52     | 1.56873 | 63.1 |
| 5  | −0.45E + 05 | $D_5$    | 1.      |      |
| 6  | 324.033     | 2.20     | 1 77250 | 49.6 |
| 7  | 59.094      | 5.57     | 1.      |      |
| 8  | −153.555    | 2.00     | 1.69680 | 55.5 |
| 9  | 57.763      | 6.05     | 1.80518 | 25.4 |
| 10 | −397.846    | 2.21     | 1.      |      |
| 11 | −75.115     | 2.00     | 1.69680 | 55.5 |
| 12 | −1633.633   | $D_{12}$ | 1.      |      |
| 13 | 100.716     | 3.69     | 1.56873 | 63.1 |
| 14 | −152.367    | 0.15     | 1.      |      |
| 15 | 95.402      | 1.70     | 1.80518 | 25.4 |
| 16 | 41.641      | 5.95     | 1.48749 | 70.1 |
| 17 | −225.502    | 0.15     | 1.      |      |
| 18 | 78.911      | 3.26     | 1.56873 | 63.1 |
| 19 | −660.382    | $D_{19}$ | 1.      |      |
| 20 | −51.571     | 1.50     | 1.60311 | 60.7 |
| 21 | 154.008     | 0.20     | 1.      |      |
| 22 | 21.617      | 2.99     | 1.75520 | 27.5 |
| 23 | 38.570      | 1.10     | 1.      |      |
| 24 | 90.343      | 1.40     | 1.71300 | 53.9 |
| 25 | 22.500      | 9.53     | 1.      |      |
| 26 | −625.395    | 1.50     | 1.67270 | 32.1 |
| 27 | 38.971      | 4.93     | 1.58913 | 61.1 |
| 28 | −35.315     |          | 1.      |      | b.f. = 98.15 Total length 287.86
The diaphragm surface lies 4.32 ahead of the 20th surface.

| f        | 51.3  | 122.4 | 292.8 |
|----------|-------|-------|-------|
| $D_5$    | 1.91  | 44.41 | 86.91 |
| $D_{12}$ | 96.77 | 43.8  | 1.54  |
| $D_{19}$ | 7.02  | 17.49 | 17.25 |

NUMERICAL DATA OF EMBODIMENT 4 f = 51.3 ~ 292.8 F-number 1: 4.5

|    | R          | D        | nd      | νd   |
|----|------------|----------|---------|------|
| 1  | 554.732    | 4.00     | 1.83400 | 37.2 |
| 2  | 113.716    | 13.25    | 1.49700 | 81.6 |
| 3  | −287.872   | 0.20     | 1.      |      |
| 4  | 106.765    | 8.58     | 1.56873 | 63.1 |
| 5  | −6235.324  | $D_5$    | 1.      |      |
| 6  | 527.828    | 2.20     | 1.77250 | 49.6 |
| 7  | 60.733     | 4.93     | 1.      |      |
| 8  | −231.597   | 2.00     | 1.69680 | 55.5 |
| 9  | 51.726     | 6.28     | 1.80518 | 25.4 |
| 10 | −1012.080  | 2.62     | 1.      |      |
| 11 | −75.605    | 2.00     | 1.69680 | 55.5 |
| 12 | −1546.937  | $D_{12}$ | 1.      |      |
| 13 | 116.652    | 3.51     | 1.56873 | 63.1 |
| 14 | −158.719   | 0.15     | 1.      |      |
| 15 | 85.589     | 1.70     | 1.80518 | 25.4 |
| 16 | 42.120     | 6.09     | 1.49700 | 81.6 |
| 17 | −178.919   | 0.15     | 1.      |      |
| 18 | 78.817     | 3.13     | 1.51633 | 64.1 |
| 19 | −1026.131  | $D_{19}$ | 1.      |      |
| 20 | −54.921    | 1.30     | 1.69680 | 55.5 |
| 21 | 209.218    | 0.20     | 1.      |      |
| 22 | 21.900     | 3.14     | 1.75520 | 27.5 |
| 23 | 39.727     | 1.15     | 1.      |      |
| 24 | 92.936     | 1.50     | 1.69680 | 55.5 |
| 25 | 22.391     | 9.55     | 1.      |      |
| 26 | −872.268   | 1.30     | 1.67270 | 32.1 |
| 27 | 38.896     | 4.92     | 1.58913 | 61.1 |
| 28 | −35.733    |          | 1.      |      | b.f. = 98.49 Total length 287.87

-continued

The diaphragm surface lies 4.19 ahead of the 20th surface.

| f | 51.3 | 122.4 | 292.8 |
|---|---|---|---|
| $D_5$ | 1.69 | 44.19 | 86.69 |
| $D_{12}$ | 96.95 | 43.98 | 1.72 |
| $D_{19}$ | 6.89 | 17.36 | 17.12 |

TERTIARY ABERRATION COEFFICIENT

Values when f=51.3 of Embodiment 1 has been regularized to 1.

| | SA | CM | AS | PT | DS |
|---|---|---|---|---|---|
| 1 | 0.0002 | 0.0019 | 0.0174 | 0.0428 | 0.5533 |
| 2 | −0.0306 | 0.0014 | −0.0001 | −0.0552 | 0.0026 |
| 3 | 0.0019 | −0.0119 | 0.0749 | 0.0590 | −0.8415 |
| 4 | 0.0226 | 0.0202 | 0.0181 | 0.1741 | 0.1720 |
| 5 | 0.0157 | −0.0707 | 0.3189 | 0.0021 | −1.4481 |
| 6 | −0.0054 | 0.0369 | −0.2521 | 0.0521 | 1.3655 |
| 7 | −0.3985 | 0.0295 | −0.0022 | −0.3709 | 0.0276 |
| 8 | 0.000 | 0.0010 | 0.1045 | −0.0998 | 0.4756 |
| 9 | 0.1827 | −0.0818 | 0.0367 | 0.0295 | −0.0296 |
| 10 | −0.0071 | −0.0284 | −0.1136 | 0.0294 | −0.3373 |
| 11 | 0.0006 | −0.0017 | 0.0050 | −0.2859 | 0.8418 |
| 12 | −0.2084 | −0.1365 | −0.0894 | 0.0249 | −0.0423 |
| 13 | 6.7102 | 1.1157 | 0.1855 | 0.1870 | 0.0619 |
| 14 | 1.7593 | −0.6397 | 0.2326 | 0.1226 | −0.1292 |
| 15 | 0.0298 | 0.0131 | 0.0057 | 0.2448 | 0.1097 |
| 16 | −7.0869 | −0.5480 | −0.0424 | −0.1465 | −0.0146 |
| 17 | 3.3373 | −1.0040 | 0.3021 | 0.0882 | −0.1174 |
| 18 | −0.1726 | −0.1078 | −0.0674 | 0.2405 | 0.1082 |
| 19 | 7.6413 | −1.9665 | 0.5061 | 0.0021 | −0.1308 |
| 20 | −46.7429 | 5.1241 | −0.5617 | −0.3826 | 0.1035 |
| 21 | −0.0524 | −0.0480 | −0.0441 | −0.1260 | −0.1559 |
| 22 | 47.7728 | 6.2441 | 0.8161 | 1.0196 | 0.2399 |
| 23 | 0.5654 | 0.4473 | 0.3538 | −0.5733 | −0.1736 |
| 24 | −1.1404 | 0.7176 | −0.4516 | 0.2256 | 0.1422 |
| 25 | −45.0060 | −7.4711 | −0.2402 | −0.9359 | −0.3612 |
| 26 | 0.0077 | 0.0276 | 0.0991 | −0.0418 | 0.2056 |
| 27 | −4.3545 | −0.9221 | −0.1953 | −0.0424 | −0.0503 |
| 28 | 36.8402 | −0.6334 | 0.0109 | 0.5519 | −0.0097 |
| Total | −0.3178 | 0.1085 | 0.0275 | 0.0361 | 0.5679 |

SA ... Spherical aberration coefficient
CM ... Coma coefficient
AS ... Astigmatism coefficient
PT ... Petzval sum
DS ... Distortion coefficient Embodiment 1  f=122.4

| | SA | CM | AS | PT | DS |
|---|---|---|---|---|---|
| 1 | 0.0067 | 0.0084 | 0.0106 | 0.0428 | 0.0673 |
| 2 | −0.9932 | 0.3592 | −0.1299 | −0.0552 | 0.0669 |
| 3 | 0.0614 | −0.0895 | 0.1305 | 0.0590 | −0.2761 |
| 4 | 0.7314 | −0.1435 | 0.0282 | 0.1741 | −0.0397 |
| 5 | 0.5084 | −0.5823 | 0.6670 | 0.0021 | −0.7665 |
| 6 | −0.1844 | 0.2762 | −0.4136 | 0.0521 | 0.5412 |
| 7 | −2.6534 | −0.0406 | −0.0006 | −0.3709 | −0.0057 |
| 8 | 0.0030 | −0.0117 | 0.0463 | −0.0998 | 0.2114 |
| 9 | 1.4531 | −0.1795 | 0.0222 | 0.0295 | −0.0064 |
| 10 | −0.0107 | −0.0300 | −0.0845 | 0.0294 | −0.1552 |
| 11 | −0.1663 | 0.1404 | −0.1185 | −0.2859 | 0.3413 |
| 12 | −1.1905 | −0.3818 | −0.1225 | 0.0249 | −0.0313 |
| 13 | 16.8042 | 1.2608 | 0.0946 | 0.1870 | 0.0211 |
| 14 | 1.3940 | −0.5174 | 0.1920 | 0.1226 | −0.1168 |
| 15 | 0.8978 | 0.1996 | 0.0444 | 0.2448 | 0.0643 |
| 16 | −16.0414 | −0.2818 | −0.0050 | −0.1465 | −0.0027 |
| 17 | 3.3332 | −1.0066 | 0.3040 | 0.0882 | −0.1184 |
| 18 | −0.0860 | −0.0262 | −0.0080 | 0.2405 | 0.0709 |
| 19 | 8.8849 | −2.2866 | 0.5885 | 0.0021 | −0.1520 |
| 20 | −46.7429 | 5.1241 | −0.5617 | −0.3826 | 0.1035 |
| 21 | −0.0524 | −0.0480 | −0.0441 | −0.1260 | −0.1559 |
| 22 | 47.7728 | 6.2441 | 0.8161 | 1.0196 | 0.2399 |
| 23 | 0.5654 | 0.4473 | 0.3538 | −0.5733 | −0.1736 |
| 24 | −1.1404 | 0.7176 | −0.4516 | 0.2256 | 0.1422 |
| 25 | −45.0060 | −7.4711 | −1.2402 | −0.9359 | −0.3612 |
| 26 | 0.0077 | 0.0276 | 0.0991 | −0.0418 | 0.2056 |
| 27 | −4.3545 | −0.9221 | −0.1953 | −0.0424 | −0.0503 |
| 28 | 36.8402 | −0.6334 | 0.0109 | 0.5519 | −0.0097 |
| Total | 0.6422 | 0.1529 | 0.0328 | 0.0361 | −0.3458 |

Embodiment 1  f=292.8

| | SA | CM | AS | PT | DS |
|---|---|---|---|---|---|
| 1 | 0.2195 | 0.0201 | 0.0018 | 0.0428 | 0.0041 |
| 2 | −32.5142 | 6.2311 | −1.1941 | −0.0552 | 0.2394 |
| 3 | 2.0103 | −0.7703 | 0.2952 | 0.0590 | −0.1357 |
| 4 | 23.9434 | −3.8962 | 0.6340 | 0.1741 | −0.1315 |
| 5 | 16.6418 | −5.4692 | 1.7974 | 0.0021 | −0.5914 |
| 6 | −5.4020 | 2.0681 | −0.7918 | 0.0521 | 0.2832 |
| 7 | −5.3461 | −0.3500 | −0.0229 | −0.3709 | −0.0258 |
| 8 | −0.4748 | 0.2647 | −0.1476 | −0.0998 | 0.1380 |
| 9 | 5.2686 | −0.0352 | 0.0014 | 0.0295 | −0.0005 |
| 10 | 0.0238 | −0.0339 | 0.0483 | 0.0294 | −0.1105 |
| 11 | −5.3356 | 1.4292 | −0.3828 | −0.2859 | 0.1791 |
| 12 | −1.5145 | −0.4984 | −0.1640 | 0.0249 | −0.0458 |
| 13 | 16.4923 | 1.2647 | 0.0970 | 0.1870 | 0.0218 |
| 14 | 1.4027 | −0.5203 | 0.1930 | 0.1226 | −0.1171 |
| 15 | 0.8639 | 0.1951 | 0.0440 | 0.2448 | 0.0652 |
| 16 | −15.7727 | −0.2950 | −0.0055 | −0.1465 | −0.0028 |
| 17 | 3.3344 | −1.0069 | 0.3041 | 0.0882 | −0.1185 |
| 18 | −0.0934 | −0.0289 | −0.0099 | 0.2405 | 0.0717 |
| 19 | 8.8563 | −2.2793 | 0.5866 | 0.0021 | −0.1515 |
| 20 | −46.7429 | 5.1241 | −0.5617 | −0.3826 | 0.1035 |
| 21 | −0.0524 | −0.0480 | −0.0441 | −0.1260 | −0.1559 |
| 22 | 47.7728 | 6.2441 | 0.8161 | 1.0196 | 0.2399 |
| 23 | 0.5654 | 0.4473 | 0.3538 | −0.5733 | −0.1736 |
| 24 | −1.1404 | 0.7176 | −0.4516 | 0.2256 | 0.1422 |
| 25 | −45.0060 | −7.4711 | −1.2402 | −0.9359 | −0.3612 |
| 26 | 0.0077 | 0.0276 | 0.0991 | −0.0418 | 0.2056 |
| 27 | −4.3545 | −0.9221 | −0.1953 | −0.0424 | −0.0503 |
| 28 | 36.8402 | −0.6334 | 0.0109 | 0.5519 | −0.0097 |
| Total | 0.4940 | −0.2748 | 0.0720 | 0.0361 | −0.4882 |

The correspondence between each embodiment and various conditions will be shown below.

| | Embodiment 1 | Embodiment 2 | Embodiment 3 | Embodiment 4 |
|---|---|---|---|---|
| (1) $F_w/|F_{II_2}|$ | 0.0258 | 0.093 | 0.0307 | 0.0054 |
| (2) $R_{II_4}/F_w$ | 1.01 | 0.93 | 1.13 | 1.01 |
| (3) $R_{II_6}/R_{II_3}$ | 0.345 | 0.253 | 0.489 | 0.326 |
| (4) $F_w/F_{III_2}$ | 0.181 | 0.104 | 0.154 | 0.251 |
| (5) $|R_{III_2}|/R_{III_1}$ | 1.53 | 1.09 | 1.51 | 1.36 |
| (6) $\dfrac{(n_{III_2} - n_{III_3})F_w}{R_{III_4}}$ | 0.393 | 0.404 | 0.391 | 0.375 |
| (7) $\nu_{III_3} - \nu_{III_2}$ | 44.7 | 44.7 | 44.7 | 56.2 |

-continued

|  | Embodiment 1 | Embodiment 2 | Embodiment 3 | Embodiment 4 |
|---|---|---|---|---|
| $\dfrac{\theta III_3 - \theta III_2}{\nu III_3 - \nu III_2}$ | −0.0022 | −0.0022 | −0.0022 | −0.0016 |
| $\theta III_2$ | 1.323 | 1.323 | 1.323 | 1.323 |
| $\theta III_3$ | 1.221 | 1.221 | 1.221 | 1.233 |

I claim:

1. A compact zoom lens of high magnification comprising, in succession from the object side, a first lens group having a positive refractive power and having a focusing function, a second lens group having a negative refractive power and movable on the optical axis to effect magnification change and having, in succession from the object side, a negative lens having its concave surface of sharper curvature facing the image side, a negative doublet lens consisting of a biconcave lens and a positive lens, and a negative lens having its concave surface of sharper curvature facing the object side, a third lens group having a positive refractive power and reciprocable on the optical axis to correct the movement of the image plane resulting from the movement of said second lens group, and a fourth lens group having a negative refractive power, said zoom lens satisfying the following conditions:

$0 < Fw/|F_{II2}| < 0.1$, but $F_{II2} < 0$
$0.85 < R_{II4}/Fw < 1.2$
$0.2 < R_{II6}/R_{II3} < 0.6$ where $F_{II2}$ is the focal length of the doublet lens in said second lens group, $R_{IIi}$ is the curvature radius of the ith lens surface in said second lens group, and Fw is the focal length of the wide angle end of the entire system.

2. A compact zoom lens of high magnification according to claim 1, wherein said third lens group satisfies the following condition:

$-0.0023 < (\theta_{III3} - \theta_{III2})/(\nu_{III3} - \nu_{III2}) < 0$ where $\theta_{IIIj}$ is the partial dispersion ratio of the glass of the jth lens in said third lens group.

3. A compact zoom lens of high magnification comprising, in succession from the object side, a first lens group having a positive refractive power and having a focusing function, a second lens group having a negative refractive power and movable on the optical axis to effect magnification change and having, in succession from the object side, a negative lens having its concave surface of sharper curvature facing the image side, a negative doublet lens consisting of a biconcave lens and a positive lens, and a negative lens having its concave surface of sharper curvature facing the object side, a third lens group having a positive refractive power and reciprocable on the optical axis to correct the movement of the image plane resulting from the movement of said second lens group, said third lens group comprises, in succession from the object side, a biconvex lens, a doublet lens consisting of a negative meniscus lens and a biconvex lens, and a positive lens having its surface of sharper curvature facing the object side, and said zoom lens satisfies the following conditions:

$0.08 < Fw/F_{III2} < 0.35$
$1.0 < |R_{III2}/R_{III1}| < 1.6$, but $R_{III2} < 0$ $$0.35 < \frac{(N_{III2} - N_{III3})}{R_{III4}} \cdot Fw < 0.45$$

$38 < \nu_{III3} - \nu_{III2} < 60$ where $F_{II2}$ is the focal length of the doublet lens in said third lens group, $R_{IIIj}$ is the curvature radius of the jth lens surface in said third lens group, $N_{IIIj}$ is the refractive index of the glass of the jth lens in said third lens group for d-line, and $\nu_{IIIj}$ is the Abbe number of the glass of the jth lens in said third lens group, and a fourth lens group having a negative refractive power, said zoom lens satisfying the following conditions:

$0 < Fw/|F_{II2}| < 0.1$, but $F_{II2} < 0$
$0.85 < R_{II4}/Fw < 1.2$
$0.2 < R_{II6}/R_{II3} < 0.6$ where $F_{II2}$ is the focal length of the doublet lens in said second lens group, $R_{IIi}$ is the curvature radius of the ith lens surface in said second lens group, and Fw is the focal length of the wide angle end of the entire system.

* * * * *